(No Model.) 5 Sheets—Sheet 1.
G. M. WESTMAN.
PROCESS OF REDUCING IRON ORES.
No. 383,201. Patented May 22, 1888.
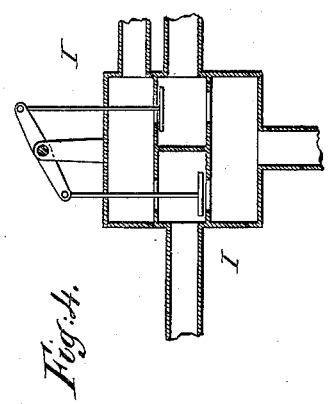
Fig. 4.
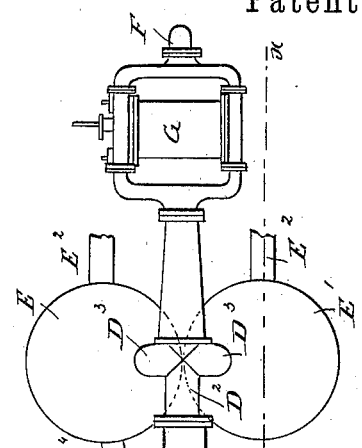
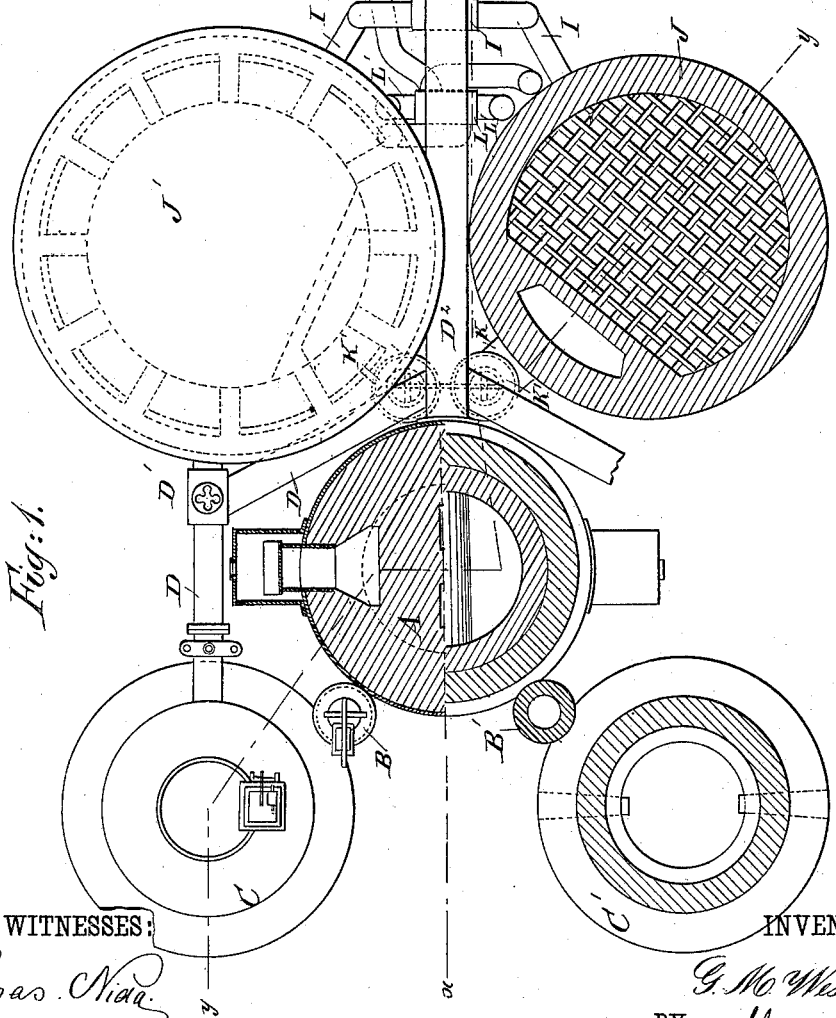
Fig. 5.
Fig. 1.
WITNESSES:
Chas. Nida.
E. M. Clark.
INVENTOR:
G. M. Westman.
BY Munn & Co.
ATTORNEYS.

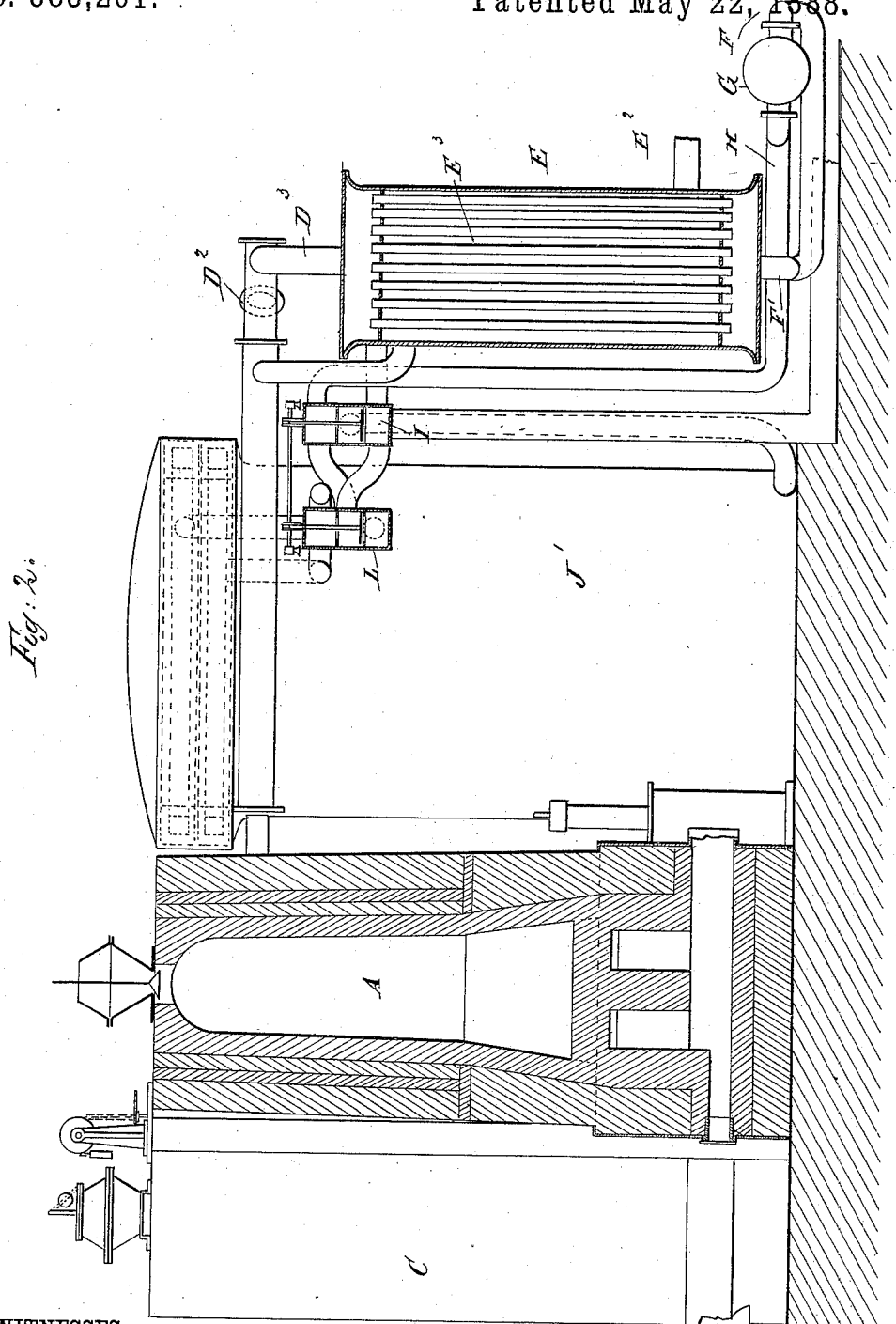

(No Model.) 5 Sheets—Sheet 3.
G. M. WESTMAN.
PROCESS OF REDUCING IRON ORES.
No. 383,201. Patented May 22, 1888.
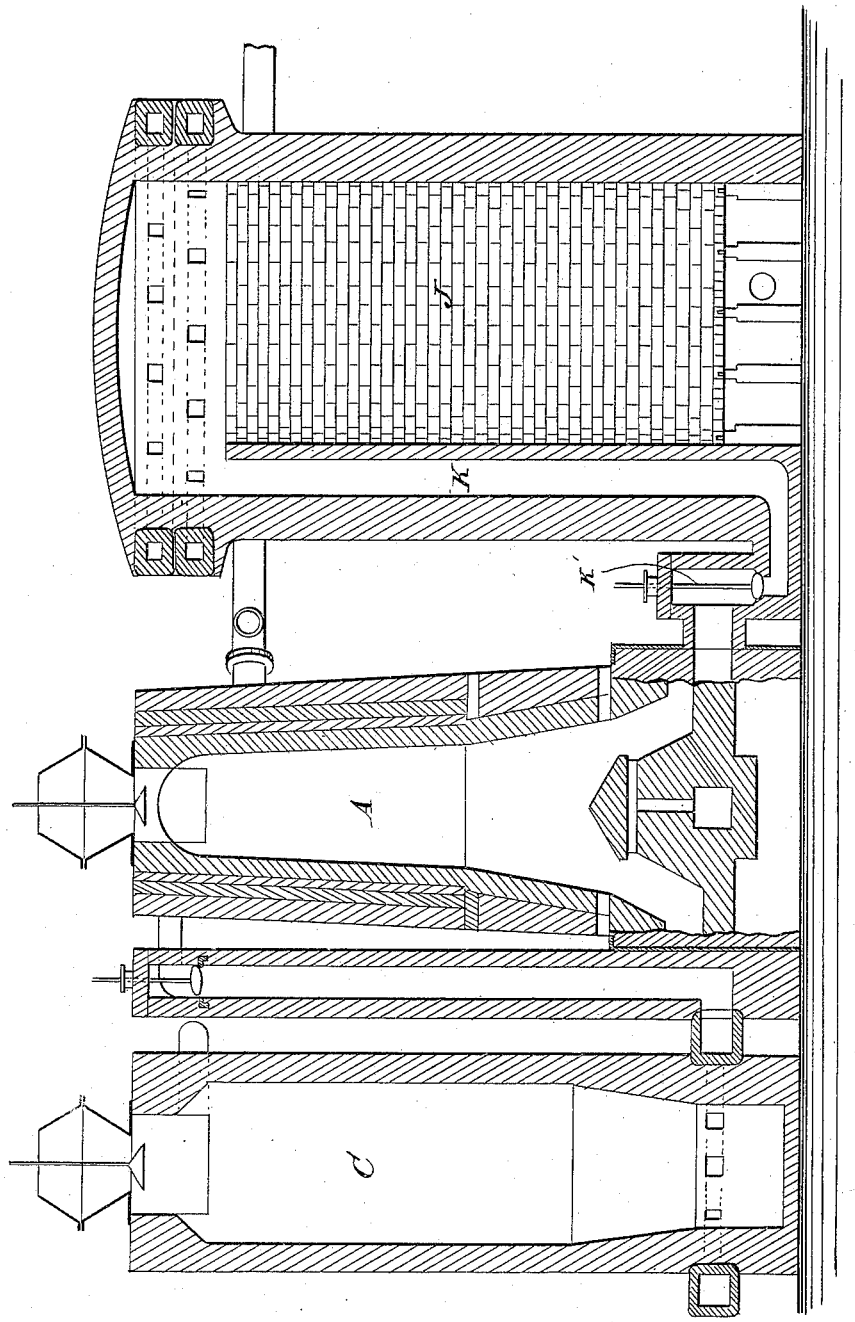

(No Model.) 5 Sheets—Sheet 4.
G. M. WESTMAN.
PROCESS OF REDUCING IRON ORES.
No. 383,201. Patented May 22, 1888.
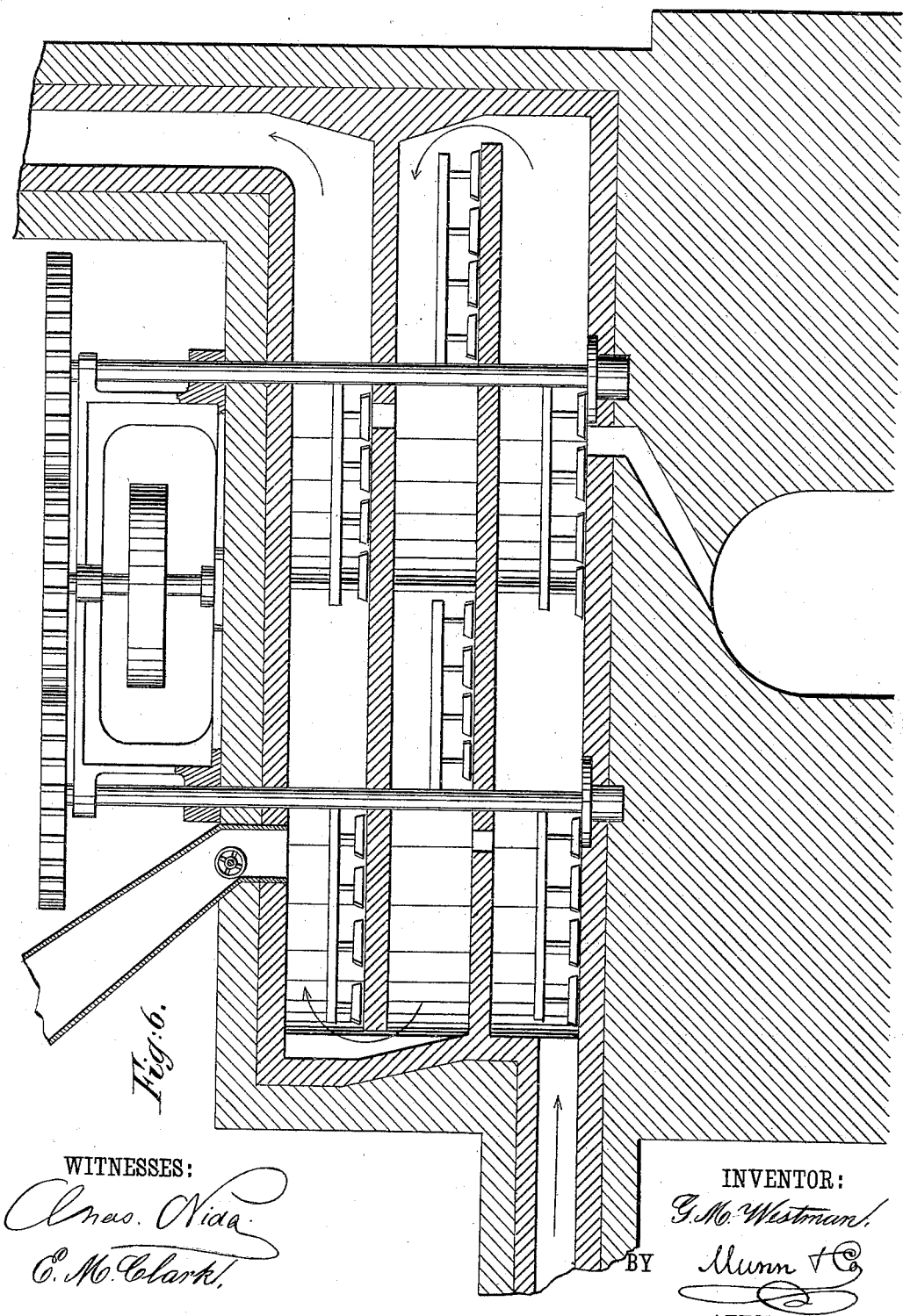
WITNESSES:
Chas. Nida
E. M. Clark
INVENTOR:
G. M. Westman
BY Munn & Co.
ATTORNEYS.

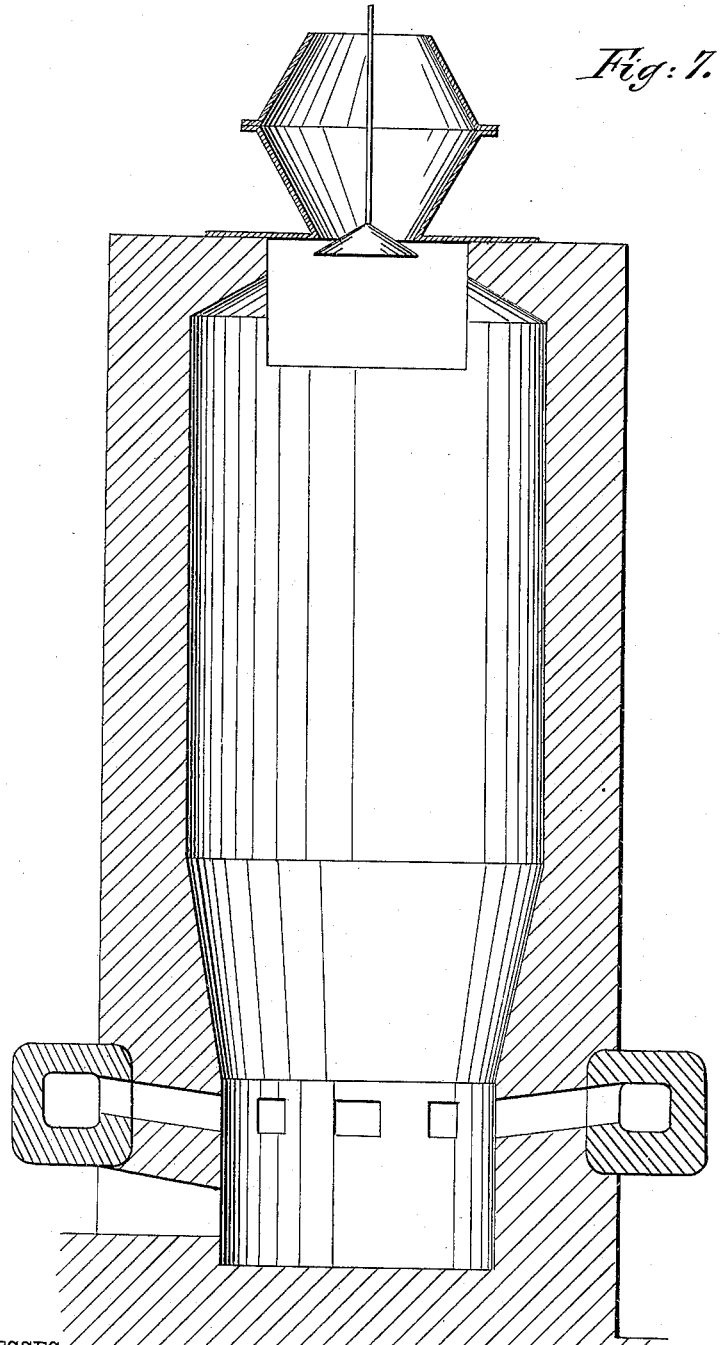

UNITED STATES PATENT OFFICE.

GUSTAF M. WESTMAN, OF STOCKHOLM, SWEDEN.

PROCESS OF REDUCING IRON ORES.

SPECIFICATION forming part of Letters Patent No. 383,201, dated May 22, 1888.

Application filed July 23, 1887. Serial No. 245,097. (No model.)

*To all whom it may concern:*

Be it known that I, GUSTAF M. WESTMAN, of Stockholm, Sweden, have invented a new and Improved Process of Reducing Iron Ores, of which the following is a full, clear, and exact description.

The object of my invention is to provide a new and improved process of reducing iron ores at a very low cost by the saving of fuel without injury to the quality of the product.

The invention consists of a process of reducing iron ores by means of carbonic oxide, in which the gas from the reducing-furnace is passed through a charge of glowing coke and then heated and again passed over and through the iron ore in the reducing-furnace.

Reference is to be had to the accompanying drawings, which illustrate means for carrying the process into effect, and in which similar letters of reference indicate corresponding parts in all the figures.

Figure 1 is a plan view of one form of furnace for carrying out my improved process, with parts in section. Fig. 2 is a longitudinal sectional elevation of the same on line *x x* of Fig. 1. Fig. 3 is a vertical cross-section of the same on the line *y y* of Fig. 1. Figs. 4 and 5 are enlarged sectional elevations of the valves, hereinafter more fully described. Fig. 6 is a sectional elevation of a modified form of a reducing-furnace for reducing pulverized ores, and Fig. 7 is a similar view of a modified form of a reducing-furnace for smelting ores.

In blast-furnaces as heretofore constructed for reducing ores the oxidation of the gases was considerably restricted, so that the gases in escaping carried with them about forty-six per cent. of the heat, which was thus utterly lost for reducing the ore, and hence a great amount of fuel was needed to reduce the ores. Part of the carbonic acid resulting from combustion is derived from the ores and lime, and the generated gases carry with them almost as much heat as the air introduced by the blast, so that the best-constructed furnaces only utilize about forty or fifty per cent. of the fuel employed. With my improved process, presently to be described, I am enabled to reduce iron ores at a very low cost by saving fuel.

The process for reducing iron ores consists of heating the ores with an externally-heated carbonic oxide gas.

My improved furnace for carrying the process into effect is provided with a reducing-furnace, A, of any approved construction and containing, in the usual manner, the ore to be reduced. The reducing-furnace A is connected by the channels B and B', respectively, with the regenerating or carbureting furnaces C and C', respectively, of like construction, and adapted to be alternately connected with the reducing-furnace A, so that when one regenerating or carbureting furnace is disconnected from the reducing-furnace the other regenerating or carbureting furnace is in operation, being connected with the reducing-furnace by the respective channel or pipe B or B'.

Each of the regenerating or carbureting furnaces C and C' is filled with coal, which is changed by the introduction of a small amount of hot air into glowing coke. From the top of each regenerating or carbureting furnace C or C' leads a pipe, D, provided with a valve, D'. The ends of the pipes D lead into a common pipe, $D^2$, provided with the branch pipes $D^3$, leading into coolers E E', connected at their bottoms by the branch pipes F' with the inlet-pipe F, leading to the circulating blast-engine G, of any approved construction.

It will be seen that when one valve, D', is open the circulating blast-engine G draws its supply from the respective regenerating or carbureting furnace C by means of the inlet-pipe F, the branch pipes F', the coolers E and E', the branch pipes $D^3$, the common pipe $D^2$, and the respective pipe D.

The circulating blast-engine G discharges into the pipe H, leading to the valve I, (shown in detail in Fig. 4,) and adapted to be alternately connected with the pipes I' and $I^2$, leading, respectively, to the regenerators J and J' of like construction. The regenerators J and J' can each be used either for heating the regenerated or carbureted gases or for burning the surplus gases, as hereinafter more fully described. Each of the regenerators J and J' is connected at its top with a pipe, K, leading into the bottom of the reducing-furnace A, and each pipe K is provided with a valve, K', so as to connect one of the regenerators with the reducing-furnace A, while the other is disconnected from the same. The valve I also connects with the valve L, (shown in detail in Fig. 5,) and adapted to be connected by the pipes L', respectively, with the regenerators J or J'.

The coolers E or E' are each provided with an inlet-pipe, $E^2$, for admitting air from the outside into the respective coolers, so that the air circulates around the pipes $E^3$ in the coolers, through which pipes $E^3$ pass the gases from the regenerating or carbureting furnaces C or C' before entering the circulating blast-engine G, whereby said gases are cooled off, and said air absorbs the heat, thus becoming heated, and then passes from its respective cooler E or E' by the pipe $E^4$ to the valve L, and from the same into the respective regenerator J or J', whenever desired.

The operation is as follows: When the circulating blast-engine G is set in motion, then the gases are driven through the pipe H into the valve I, and then passed into the bottom of the respective regenerator J or J' through the pipe I' or $I^2$, respectively. The gases thus passing into the regenerator J or J' are very strongly heated and rise to the top, from which they pass into the respective pipe K, which leads the regenerated or carbureted and heated gases into the bottom of the reducing-furnace A. The regenerated or carbureted and heated gases now pass through the ores held in the reducing-furnace A, thus reducing the ores. The waste gases arising in the reducing-furnace are passed into the bottom of the respective regenerating or carbureting furnace C or C' by the respective pipe or channel B or B', and the waste gases are supplied with carbon while passing through the glowing coke. The gases now pass into the pipe D, leading from the respective regenerating or carbureting furnace C or C', and after passing through the valve D' flow into the common pipe $D^2$, and from the same by the branch pipes $D^3$ into the coolers E or E', in which the temperature of the gases is considerably reduced by the circulation of the cool air, as before described, and then the gases are drawn into the branch pipes F' and the inlet-pipe F by the circulating blast engine G, thus completing the circuit.

It will be seen that a constant surplus of gas is formed in the regenerating or carbureting furnaces C or C', and new gases are constantly formed by the reducing process and mixed with the gas supplied and not fully consumed. This surplus of gas is separated from the main stream of gas in the valve I, and passes from the latter into the valve L, from which it passes into the regenerator and is mixed with the air from the coolers E or E', which passes through said valve L by the pipes $E^4$, as illustrated in Fig. 5. This mixture of gas and air is burned in the respective regenerators J or J' with the air-supply by the chimney-draft. Thus the surplus gases are burned, and the heat generated may be utilized for various purposes.

When the coke in the respective furnaces C or C' is used up, then the furnace C or C' is disconnected from the reducing-furnace A and refilled with coke, while in the meantime the other furnace C or C' is connected with the reducing-furnace A, so that no interruption of the process takes place.

It will be seen that a continuous reduction of ores can be carried on at a small expenditure of fuel, as the gases arising in the reducing-furnace are used over and over again after being regenerated or carbureted and heated, as above described.

The furnace A, as illustrated in Figs. 1, 2, and 3, is specially constructed for reducing lump-ore; but when the ore is in a pulverized state I employ the furnace illustrated in Fig. 6. This furnace is provided with three or more compartments, in which the ores are spread, and over which the carbonic oxide and heated gases from the regenerator J or J' respectively pass.

If I desire to smelt the iron sponge produced in the above process, I employ, instead of the furnace A, (shown in Figs. 1 and 6,) the usual shaft-furnace. (Illustrated in Fig. 7.) In this furnace a small quantity of gas is burned with the air for producing the necessary heat; but the waste gases are regenerated or carbureted and heated in the manner above described. If the ore to be reduced contains chrome, manganese, or other mineral substances, which are not readily reduced by the heated and carbureted gases, I mix the ore with a small quantity of coal, thus facilitating the reduction when the heated and carbureted gas is passed over or through the ore.

Having thus described my invention, what I claim as new, and desire to secure by Letters Patent, is—

1. The herein-described process for reducing iron ores by means of carbonic oxide, which consists in passing heated carbonic oxide through a charge of iron ore, drawing off the gases from the charge and passing them over glowing coke, then superheating these gases, after which they are again passed over or through the ore to be reduced, substantially as shown and described.

2. The herein-described process for reducing iron ores by means of carbonic oxide, which consists in passing heated carbonic oxide through a charge of iron ore, drawing off the gases from the charge and passing them over glowing coke, cooling the gases, as described, then superheating these gases, after which they are again passed over or through the ore to be reduced, substantially as shown and described.

GUSTAF M. WESTMAN.

Witnesses:
 THEO. G. HOSTER,
 C. SEDGWICK.